(12) United States Patent
Yoshikane (10) Patent No.: US 9,987,754 B2
(45) Date of Patent: Jun. 5, 2018

(54) GRIPPER DEVICE

(71) Applicant: TOYO JIDOKI CO., LTD., Tokyo (JP)

(72) Inventor: Tohru Yoshikane, Iwakuni (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 0 days. days.

(21) Appl. No.: 15/277,065

(22) Filed: Sep. 27, 2016

(65) Prior Publication Data

US 2017/0100843 A1 Apr. 13, 2017

(30) Foreign Application Priority Data

Oct. 7, 2015 (JP) .................................. 2015-199621

(51) Int. Cl.
*B25J 15/00* (2006.01)
*B65B 43/46* (2006.01)
(Continued)

(52) U.S. Cl.
CPC ....... *B25J 15/0052* (2013.01); *B25J 15/0028* (2013.01); *B65B 43/32* (2013.01);
(Continued)

(58) Field of Classification Search
CPC ....... B65B 43/465; B65B 43/50; B65B 43/44; B65B 39/00; B65B 51/10; B65B 51/32; B65B 61/025; B65B 3/045; B65B 59/00; B65B 43/32; B08B 9/426; B65G 47/847; B65G 2201/0244; B25J 15/0052; B25J 15/0028

See application file for complete search history.

(56) References Cited

U.S. PATENT DOCUMENTS 5,182,898 A 2/1993 Tung et al.
5,893,700 A * 4/1999 Kronseder ............. B08B 9/426
198/803.9
(Continued)

FOREIGN PATENT DOCUMENTS

DE 41 37 961 A1 5/1993
DE 296 07 868 U1 6/1997
(Continued)

OTHER PUBLICATIONS

Extended European Search Report as issued in European Patent Application No. 16190752.2, dated Mar. 2, 2017.

*Primary Examiner* — Stephen A Vu
(74) *Attorney, Agent, or Firm* — Pillsbury Winthrop Shaw Pittman, LLP (57) ABSTRACT

A gripper device includes: a carrier device movably provided; a plurality of gripper pairs attached to the carrier device through supports; and a distance adjustment mechanism that adjusts a distance between one gripper and another gripper included in each of the plurality of gripper pairs, wherein, the one gripper and the another gripper included in each of the plurality of gripper pairs are attached to the carrier device through a same support, and the distance adjustment mechanism swings at least one of the one gripper and the another gripper included in each of the plurality of gripper pairs around the same support in such a manner that a distance between the one gripper and the another gripper is adjusted.

14 Claims, 4 Drawing Sheets

(51) Int. Cl.
*B65B 59/00* (2006.01)
*B65B 43/32* (2006.01)
*B65G 47/86* (2006.01)

(52) U.S. Cl.
CPC ............ *B65B 43/465* (2013.01); *B65B 59/00* (2013.01); *B65G 47/847* (2013.01)

(56) References Cited

U.S. PATENT DOCUMENTS

| | | | | |
|---|---|---|---|---|
| 6,079,541 A | * | 6/2000 | Bercelli | ................. B08B 9/426 198/377.03 |
| 2008/0272609 A1 | * | 11/2008 | Knieling | .............. B65G 47/847 294/90 |
| 2009/0020394 A1 | * | 1/2009 | Burgmeier | ............. B65G 47/90 198/377.01 |
| 2012/0086229 A1 | * | 4/2012 | Bodtlander | ............ B65G 47/90 294/198 |

FOREIGN PATENT DOCUMENTS

| | | |
|---|---|---|
| EP | 1 712 496 A1 | 10/2006 |
| EP | 2 902 329 A1 | 8/2015 |
| JP | 2004-244085 A | 9/2004 |
| JP | 2011-031896 A | 2/2011 |

* cited by examiner

GRIPPER DEVICE

CROSS-REFERENCE TO RELATED APPLICATIONS

This application is based upon and claims the benefit of priority from Japanese Patent Application No. 2015-199621, filed on Oct. 7, 2015; the entire contents of which are incorporated herein by reference.

TECHNICAL FIELD

The present invention relates to a gripper device capable of holding a container such as a bag, and more particularly to a gripper device that can adjust a distance between grippers in a pair of grippers.

BACKGROUND ART

Conventionally, there has been known a bag transfer device (gripper device) including a plurality of gripper pairs (pairs of right and left grippers) provided on a table that is horizontally rotated, and a distance adjustment mechanism for adjusting a distance between the right and left grippers in each of the pairs.

For example, Japanese patent application publication No. 2011-031896 discloses a rotary packaging machine that is capable of adjusting a holding angle of a holding arm for holding a packaging member. In addition, Japanese patent application publication No. 2004-244085 discloses a so-called W-type bagging and packaging device in which both of a bag making device and a rotary bagging and packaging device are provided to perform packing operation of two bags held by grippers while the two bags are juxtaposed side by side.

SUMMARY OF INVENTION

Technical Problem

In a case where operation for two bags (containers) is simultaneously performed as with the W-type bagging and packaging machine described above, each of the two bags juxtaposed side by side is held by a pair of right and left grippers, and a distance between the right and left grippers in the pair is adjusted so as to control opening and closing of each of the bags.

For example, when the rotary packaging machine of Japanese patent application publication No. 2011-031896 performs processes on two bags, the two bags to be processed are respectively held by a first pair of holding arms (grippers) and a second pair of holding arms, the first and second pairs being adjacent to each other. In addition, the W-type bagging and packaging machine of Japanese patent application publication No. 2004-244085 holds two bags by using respective two adjacent gripper pairs, and simultaneously performs processes on the two bags that are intermittently moved.

Opening/closing operation (i.e., distance adjustment operation) of a gripper in the gripper device of this type is performed around a pivot fulcrum of the gripper, and the pivot fulcrum of this type is provided for each gripper. The rotary packaging machine of Japanese patent application publication No. 2011-031896, for example, allows right and left holding arms for holding each bag to pivot with respect to the corresponding holding shafts (pivot fulcrum) juxtaposed side by side. In addition, the W-type bagging and packaging machine of Japanese patent application publication No. 2004-244085 also allows each gripper to pivot around a pivot fulcrum provided for each gripper, as with the rotary packaging machine of Japanese patent application publication No. 2011-031896.

In a case where a pivot fulcrum is provided for each gripper in this manner, for example, juxtaposing two gripper pairs for simultaneously holding two bags, side by side, causes four grippers to be sequentially provided. As a result, the conventional device needs to secure a space allowing four pivot fulcrums to be juxtaposed. Particularly, in a case where two gripper pairs juxtaposed simultaneously perform opening/closing operation as with the W-type bagging and packaging machine above, a distance between pivot fulcrums needs to be sufficiently large to prevent interference in opening/closing operation between the gripper pairs.

In a case where a pivot fulcrum is provided for each gripper in this manner, an installation space for pivot fulcrums over a relatively wide range needs to be secured. Particularly, in a rotary device in which a large number of gripper pairs are sequentially provided in an outer peripheral portion of a carrier table, a diameter of the carrier table needs to be large to make the outer peripheral portion of the carrier table wide so that a space for providing pivot fulcrums assigned to the respective grippers is secured. Increasing the diameter of the carrier table in this way causes the entire device to be increased in size, and causes increase in centrifugal force acting on each bag as well as in movement speed of each bag in a rotation direction when the carrier table is rotated. As a result, there is concern that contents such as liquid with which each bag is filled may burst out from the bag.

Solution to Problem

The present invention has been contrived in light of the above-mentioned circumstances, and an object thereof is to provide a gripper device in which a plurality of gripper pairs can be provided in a compact manner.

One aspect of the present invention is directed to a gripper device comprising: a carrier device movably provided; a plurality of gripper pairs attached to the carrier device through supports; and a distance adjustment mechanism that adjusts a distance between one gripper and another gripper included in each of the plurality of gripper pairs, wherein the one gripper and the another gripper included in each of the plurality of gripper pairs are attached to the carrier device through a same support, and the distance adjustment mechanism swings at least one of the one gripper and the another gripper included in each of the plurality of gripper pairs around the same support in such a manner that a distance between the one gripper and the another gripper is adjusted.

According to this aspect of the present invention, a plurality of grippers (i.e., one gripper and another gripper) included in each gripper pair is attached to a carrier device through a same support, and thus a plurality of gripper pairs can be compactly provided.

Desirably, the plurality of gripper pairs includes a first gripper pair having first and second grippers, and a second gripper pair having third and fourth grippers, the distance adjustment mechanism includes a force applying mechanism capable of applying force to the first gripper, and a force transmitting mechanism that transmits force between the first gripper pair and the second gripper pair, the force applying mechanism swings the first gripper to adjust a distance between the first gripper and the second gripper, and the force transmitting mechanism transmits the force applied to the first gripper from the force applying mechanism, to the fourth gripper to swing the fourth gripper in such a manner that a distance between the third and fourth grippers is adjusted.

According to this aspect, opening and closing of the first and second gripper pairs are enabled to be appropriately controlled. The second and third grippers may be swung along with the first and fourth grippers, or may not be swung along therewith. It is preferable that the second and third grippers are also swung, from a viewpoint of appropriate opening and closing of a bag (container) held by a gripper pair.

Desirably, the force transmitting mechanism includes a first coupling mechanism that couples the first and fourth grippers to each other, and when the force applying mechanism moves the first gripper in a direction away from the second gripper, the fourth gripper moves in a direction away from the third gripper.

According to this aspect, the fourth gripper is enabled to be swung together with the first gripper.

Desirably, the distance adjustment mechanism includes a first elastic member that couples the first and fourth grippers to each other, when the force applying mechanism increases the force applied to the first gripper, the first and fourth grippers move against elastic force of the first elastic member applied to the first and fourth grippers, and when the force applying mechanism reduces the force applied to the first gripper, the first and fourth grippers move due to the elastic force of the first elastic member.

According to this aspect, opening and closing operation of the first and second gripper pairs are enabled to be appropriately performed with a simple mechanism.

The first coupling mechanism may include a coupling shaft provided with at least one of the first and fourth grippers, and a fitting hole into which the coupling shaft is fitted, the fitting hole being provided in the other of the first and fourth grippers to movably hold the coupling shaft.

According to this aspect, force is enabled to be appropriately transmitted from the first gripper to the fourth gripper.

Desirably, the force transmitting mechanism includes a coupling rod that couples the first and third grippers to each other, and the third gripper swings in conjunction with the first gripper.

According to this aspect, force is enabled to be appropriately transmitted from the first gripper to the third gripper.

Desirably, the distance adjustment mechanism includes a second elastic member that couples the second and third grippers to each other, the force transmitting mechanism includes a second coupling mechanism that couples the second and third grippers to each other, when the third gripper moves in a direction approaching the fourth gripper, the second gripper moves in a direction approaching the first gripper, and when the third gripper moves in a direction away from the fourth gripper, the second gripper moves in a direction away from the first gripper.

According to this aspect, the second and third grippers are enabled to be appropriately opened and closed.

Desirably, the second and third grippers are attached to the supports at a position different, in terms of an axial direction of the supports, from that of the first and fourth grippers.

According to this aspect, interference between grippers is enabled to be effectively avoided while increasing space efficiency.

Desirably, the carrier device includes a rotation shaft, and a rotary table that is attached to the rotation shaft and is rotated with the rotation shaft, the plurality of gripper pairs are attached to the rotary table through the supports, the force applying mechanism includes a cylindrical cam having a cam face, a cam lever part attached to the rotary table, the cam lever part including a cam follower that moves on the cam face, and a pressing roller that can be brought into contact with the first gripper, a position of the cam face changes in an axial direction of the rotation shaft with respect to a rotation direction of the rotary table, the cam follower is brought into contact with the cam face at a position depending on rotation of the rotary table, and the cam lever part takes a posture corresponding to a position at which the cam follower is in contact with the cam face, and varies force to be applied to the first gripper through the pressing roller depending on the posture.

According to this aspect, force to be applied to the first gripper is enabled to be varied in accordance with rotation of the rotary table.

According to the present invention, a plurality of grippers included in each gripper pair are attached to a carrier device through the same support, and thus a plurality of gripper pairs can be compactly provided.

DESCRIPTION OF EMBODIMENTS

Hereinafter, one embodiment of the present invention will be described with reference to the drawings.

Figure 1:
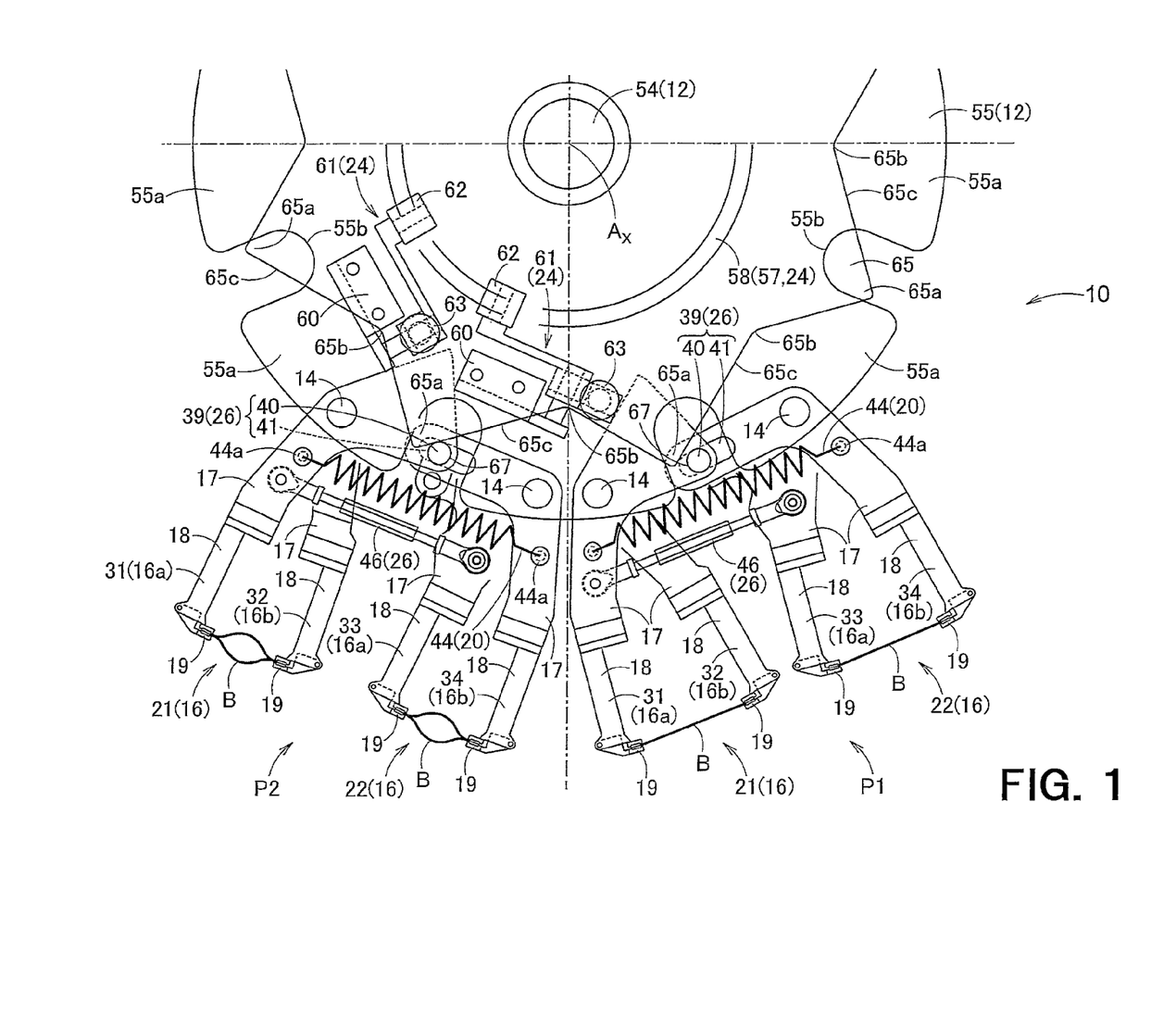
FIG. 1 is a plan view of a gripper device in accordance with one embodiment of the present invention, as viewed from above.
Figure 2:
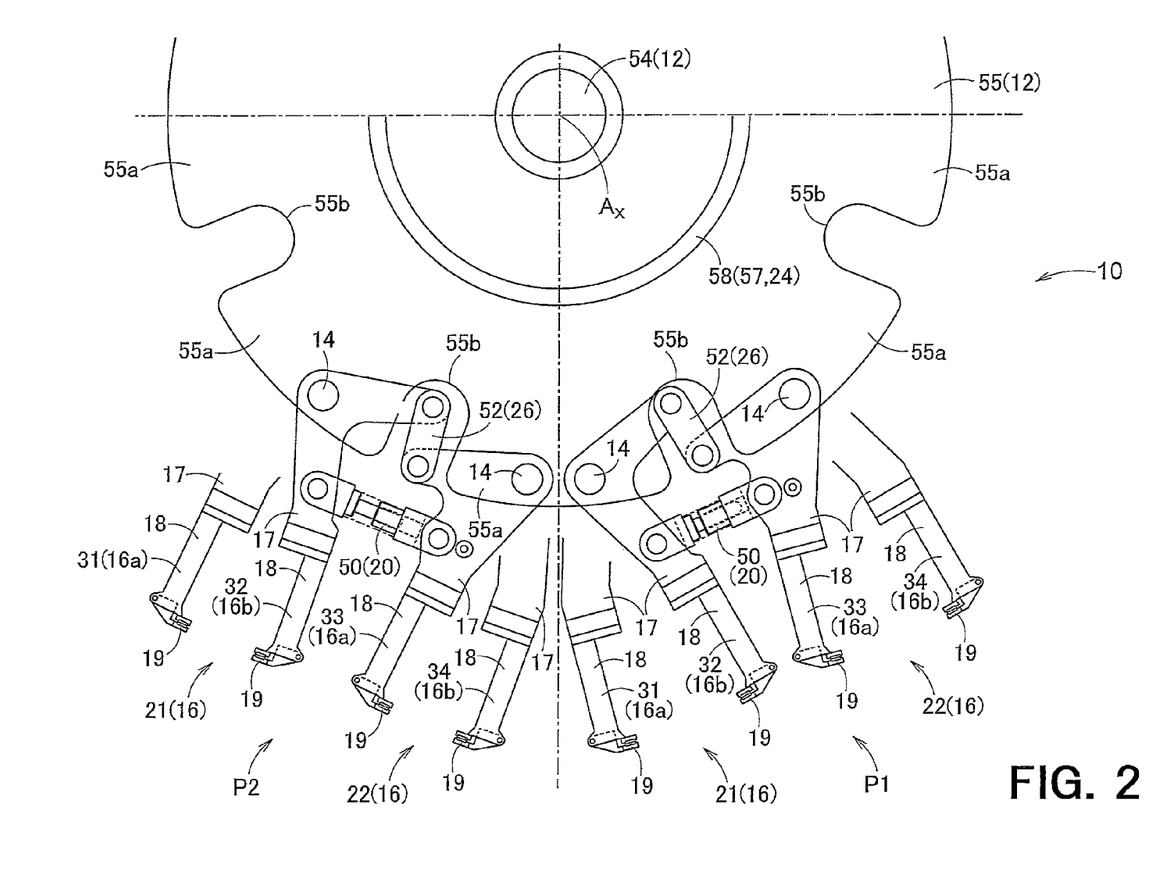
FIG. 2 is a plan view of the gripper device in accordance with the one embodiment of the present invention, as viewed from below.
Figure 3:
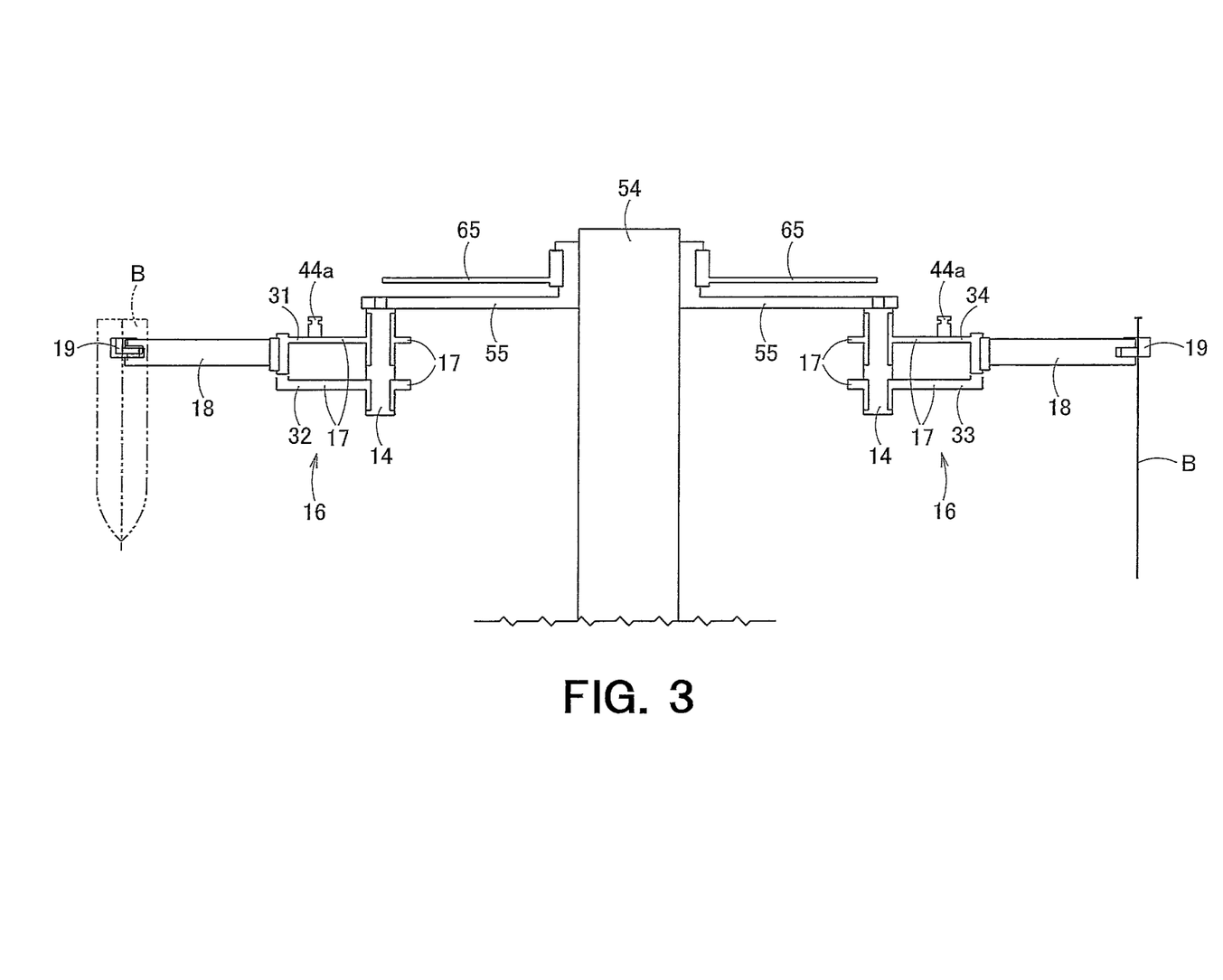
FIG. 3 is a sectional view of the gripper device in accordance with the one embodiment of the present invention, as viewed sideways.
Figure 4A:
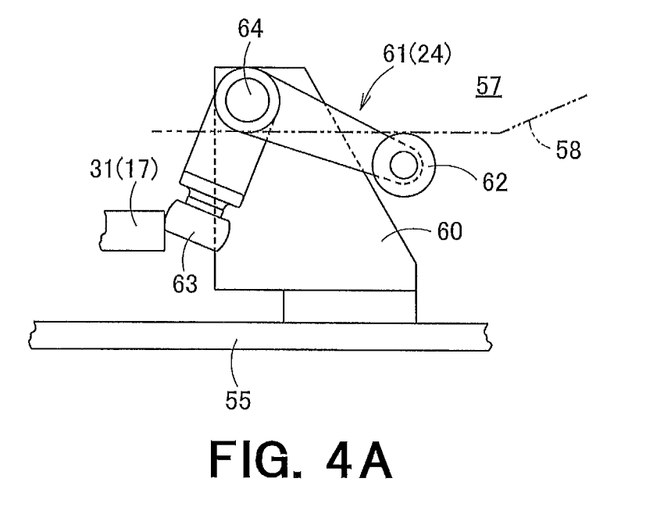
FIG. 4A illustrates an example of a cam lever part (pressing roller) that is in contact with a first gripper (gripper lever part).
Figure 4B:
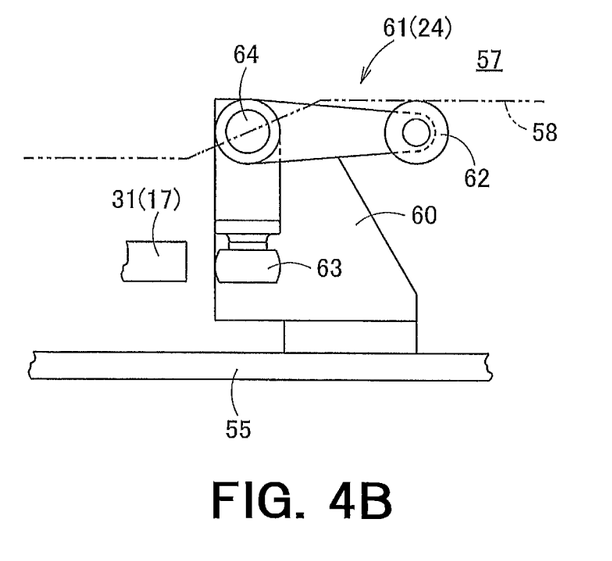
FIG. 4B illustrates an example of the cam lever part (pressing roller) that is not in contact with the first gripper (gripper lever part).

FIG. 1 a plan view of a gripper device 10 in accordance with the one embodiment of the present invention as viewed from above. FIG. 2 is a plan view of the gripper device 10 in accordance with the one embodiment of the present invention as viewed from below. FIG. 3 is a sectional view of the gripper device 10 in accordance with the one embodiment of the present invention as viewed sideways. FIGS. 4A and 4B illustrate an example of a cam lever part 61. FIG. 4A illustrates the cam lever part 61 (pressing roller 63) that is in contact with a first gripper 31 (gripper lever part 17). FIG. 4B illustrates the cam lever part 61 (pressing roller 63) that is not in contact with the first gripper 31 (gripper lever part 17).

For easy understanding, FIGS. 1 to 4B might include elements having a size different from the actual size, and do not illustrate a part of the elements (and a portion of each of elements). However, a person skilled in the art can obviously appropriately understand structure and action of each of the elements included in the gripper device 10 illustrated in FIGS. 1 to 4. For example, FIG. 1 mainly illustrates specific structure related to a carrier device 12, a force applying mechanism 24, a force transmitting mechanism 26, and gripper pairs 16 (particularly a coupled form of a first gripper 31 and a fourth gripper 34, and a coupled form of the first gripper 31 and a third gripper 33). FIG. 2 mainly illustrates specific structure related to a rotary table 55, a force transmitting mechanism 26, and the gripper pairs 16 (particularly a coupled form of a second gripper 32 and the third gripper 33). FIG. 3 mainly illustrates specific structure of a rotation shaft 54, a star-shaped cam 65, the rotary table 55, and the gripper pairs 16. FIGS. 4A and 4B mainly illustrate specific structure of the rotary table 55, a cam lever part 61 (force applying mechanism 24), and a gripper (particularly a first gripper 31).

The gripper device 10 of the present embodiment includes a rotary carrier device 12 movably provided, a plurality of gripper pairs 16 (at least two gripper pairs 16, for example, sixteen gripper pair 16) attached to the carrier device 12 through supports 14, and a distance adjustment mechanism 20 adjusting a distance between one gripper 16a and the other gripper 16b constituting each of the plurality of gripper pairs 16.

The carrier device 12 of the present example includes the rotation shaft 54, and the rotary table 55 attached to the rotation shaft 54 to be rotated with the rotation shaft 54. The rotation shaft 54 rotates around a rotation axis Ax under the control of a controller (not illustrated), and the rotary table 55 is driven by the rotation shaft 54 to be rotated integrally with the rotation shaft 54. The rotation shaft 54 and the rotary table 55 of the present example intermittently rotate by a predetermined angle, and repeat turning-on and turning-off (stop) of rotation. Particularly, in a case where a plurality of processes are continuously performed on a bag B held by each of the gripper pairs 16, rotation of the rotation shaft 54 and the rotary table 55 is stopped during each process being performed. Meanwhile, the rotation shaft 54 and the rotary table 55 are rotated to move the bag B to a position (a process position, also called as a station) where a subsequent process is performed. The turning-on and turning-off of rotation of the rotation shaft 54 and the rotary table 55 described above are appropriately controlled by the controller (not illustrated).

The plurality of gripper pairs 16 are attached to an outer peripheral portion of the rotary table 55 at equal intervals (equal angle intervals) through the corresponding supports 14 fixed to the rotary table 55, to be rotated integrally with the rotary table 55. Particularly, each of the gripper pairs 16 of the present example is disposed below the rotary table 55 (refer to FIG. 3), and intermittently moves along a circular moving path. Each of the plurality of gripper pairs 16 includes two grippers (i.e., right and left grippers) 16a and 16b, and the right and left grippers 16a and 16b holding a bag (container) B are opened and closed to open and close a filling inlet portion of the bag B.

The outer peripheral portion of the rotary table 55 of the present example, as shown in FIGS. 1 and 2, includes a plurality of table protrusions 55a (e.g., eight table protrusions 55a) provided at equal intervals (equal angle intervals), and table cutout portions 55b are formed between the table protrusions 55a. Each of the table protrusions 55a has two supports 14. Through the two supports 14, two of the gripper pairs 16 are attached to each of the table protrusions 55a (rotary table 55). One of the two gripper pairs 16 attached to each of the table protrusions 55a constitutes a first gripper pair 21 (the first gripper 31 and the second gripper 32) described later, the other thereof constitutes a second gripper pair 22 (the third gripper 33 and the fourth gripper 34), and these first gripper pair 21 and the second gripper pair 22 are disposed at different process positions (a "process position P1" and a "process position P2" in the example illustrated in FIG. 1).

Each of the right and left grippers 16a and 16b includes a gripper lever part 17 attached to the support 14 to be able to swing (rotate) with respect to the support 14, and a gripper leading end portion 18 fixed to one end of the gripper lever part 17 to be swung integrally with the gripper lever part 17. The gripper lever part 17 has a bent shape (refer to FIGS. 1 and 2), and the support 14 is attached to a bent portion corresponding to an intermediate portion between the opposite ends of the gripper lever part 17. At a leading end of the gripper leading end portion 18, a clamp portion 19 for holding a side edge of a bag B to be processed is provided. Both side edges of a bag B are held by the corresponding right and left grippers 16a and 16b respectively.

Each of the gripper pairs 16 is opened and closed in conjunction with rotation of the rotary table 55, and thus a distance between the right and left grippers 16a and 16b is changed corresponding to a position of each of the gripper pairs 16 in a rotation direction, to define opening degree of the inlet portion of the bag B. During course of rotating the rotary table 55 through 360 degrees, various processes are performed at a plurality of positions (e.g., eight positions (including the process positions "P1" and "P2" referred to in FIG. 1)) at which the respective gripper pairs 16 are disposed. At each of the process positions, the opening of the inlet portion of the bag B is controlled to be degree required for the corresponding process. Specific processes to be performed at the respective process positions are not particularly limited. For example, a bag supply step of supplying a bag B to be processed to a gripper pair 16, a printing step of performing a print process on a bag B, an opening step of opening the inlet portion of a bag B, a filling step of filling a bag B with objects (contents) through the inlet portion, a closing step of closing the inlet portion of a bag B, a sealing step of sealing the inlet portion of a bag B, a cooling step of cooling a bag B (particularly the inlet portion), an ejecting step of discharging a bag B removed from the gripper pair 16, and the like, may be performed at the respective process positions. In addition, a step of performing another process (e.g., a step of inspecting presence of printing failure, a step of detecting a state of the bag B, a step of eliminating a defective bag B, and/or a step of applying a desired fold to the bag B) may be performed at any process position.

Particularly, in the present embodiment, the right and left grippers 16a and 16b constituting each of the gripper pairs 16 are attached to the rotary table 55 (carrier device 12) through the same support 14. Fixing the plurality of grippers (right and left grippers) 16a and 16b constituting each of the gripper pairs 16 to the rotary table 55 through the same support 14 enables space-saving, and thus the plurality of gripper pairs 16 can be compactly provided. In addition, the present embodiment allows the grippers 16a and 16b of two adjacent gripper pairs 16 to be opened and closed in conjunction with each other. That is, opening the right and left grippers 16a and 16b of one of the two gripper pairs 16 opens the right and left grippers 16a and 16b of the other gripper pair 16. Meanwhile, closing the right and left grippers 16a and 16b of the one gripper pair 16 closes the right and left grippers 16a and 16b of the other gripper pair 16. Detailed structure of the gripper pairs 16 will be described later.

The distance adjustment mechanism 20 swings at least any one of the right and left grippers 16a and 16b constituting each of the plurality of gripper pairs 16, around the same support 14 commonly supporting the right and left grippers 16a and 16b, to adjust a distance between the right and left grippers 16a and 16b. Specific structure of the distance adjustment mechanism 20 is not particularly limited. The distance adjustment mechanism 20 of the present example includes a cylindrical cam 57 and a cam lever part 61. The cylindrical cam 57 and the cam lever part 61 work together to control a distance between the right and left grippers 16a and 16b of each of the gripper pairs 16.

The cylindrical cam 57 of the present example is attached to the rotation shaft 54 below the rotary table 55, and is provided to be movable in an axial direction of the rotation shaft 54 along the rotation shaft 54. The cylindrical cam 57 does not basically rotate in a rotation direction of the rotation shaft 54, and does not rotate even if the rotation shaft 54 rotates. The cylindrical cam 57 includes a cam face 58 provided to surround the rotation shaft 54 in the periphery thereof through 360 degrees. The cam face 58 varies in its position (i.e., axial position) in terms of the axial direction of the rotation shaft 54. That is, the cam face 58 is provided along a moving path of a cam follower 62 described later, and has an axial position rising and falling in the rotation direction of the rotary table 55. As described below, a distance between the right and left grippers 16a and 16b of each of the gripper pairs 16 varies corresponding to the axial position of the cam face 58, with which the cam follower 62 is in contact. Thus, the axial position of the cam face 58 is defined depending on each of the process positions. This adjusts a distance between the right and left grippers 16a and 16b of each of the gripper pairs 16 to control opening/closing of the inlet portion of a bag B so that the corresponding process can be appropriately performed at each process position.

An axial position of the entire cylindrical cam 57 may be fixed or variable. Since opening/closing degree of each of the gripper pairs 16 varies in accordance with a relative axial distance of the cam face 58 with respect to the rotary table 55, in a case where the maximum distance between the right and left grippers 16a and 16b of each of the gripper pairs 16 needs to be adjusted, it is preferable to provide an axial position adjustment mechanism for varying the axial position of the entire cylindrical cam 57. Specific structure of the axial position adjustment mechanism is not particularly limited, and a mechanism for varying the axial position of the entire cylindrical cam 57 can be appropriately embodied by using a mechanism formed by combining known members, such as a mechanism disclosed in Japanese utility-model application publication No. 63-131905 (i.e. a mechanism including a handle, a screw shaft, and a lever), for example.

Meanwhile, the cam lever part 61 includes the cam follower 62 which moves on the cam face 58 while rotating, and the pressing roller 63 which can be brought into contact with the grippers (particularly the first gripper 31), and has an L shape as a whole (refer to FIGS. 4A and 4B). That is, one end of an L-shaped body of the cam lever part 61 is provided with the cam follower 62, and the other end thereof is provided with the pressing roller 63. A lever oscillating shaft 64 is provided at a corner (bent portion) between the opposite ends of the L-shaped body. The lever oscillating shaft 64 is attached to the rotary table 55 through a bracket 60. The cam lever part 61 is supported by the rotary table 55 through the lever oscillating shaft 64 and the bracket 60, and is provided to be able to swing around the lever oscillating shaft 64.

The cam follower 62 rotates around the rotation shaft 54 together with the rotary table 55 to be brought into contact with the cam face 58 at a position in accordance with the rotation of the rotary table 55. The cam lever part 61 takes a posture corresponding to the axial position of the cam face 58 with which the cam follower 62 is in contact, so that force applied to the grippers (particularly, the first gripper 31 described later) from the cam lever part 61 through the pressing roller 63 varies corresponding to the posture of the cam lever part 61. That is, rotation of the cam lever part 61 with the rotary table 55 causes the cam follower 62 to vary its axial position while moving on the cam face 58, and then the posture of the cam lever part 61 varies corresponding to the axial position of the cam follower 62, whereby a position of the pressing roller 63 (particularly a position in a direction (i.e., the horizontal direction) perpendicular to the axial direction also varies. Depending on the position of the pressing roller 63, force received by the grippers (particularly, the first gripper 31 described later) from the pressing roller 63 (cam lever part 61) varies to change a distance between the grippers of each of the gripper pairs 16.

The pressing roller 63 of the present example is provided to be able to be brought into contact with a side face at a tail end of the gripper lever part 17 of the first gripper 31 to serve to define an opening/closing position of the first gripper 31 (and opening/closing positions of the second gripper 32 to the fourth gripper 34 described later). That is, a placement position of the pressing roller 63 is determined corresponding to the axial position of the cam follower 62, and then the placement position of the pressing roller 63 defines an opening/closing position of the first gripper 31 (and opening/closing positions of the second gripper 32 to the fourth gripper 34 described later). In the present example, the pressing roller 63 may be disposed at a position away from the first gripper 31 rather than in contact with the first gripper 31 (refer to FIG. 4B). In this case, the first gripper 31 receives no force from the pressing roller 63 to cause a distance between the right and left grippers 16a and 16b of the gripper pair 16 to be smaller.

As described above, the cylindrical cam 57 (cam face 58) and the cam lever part 61 (cam follower 62 and pressing roller 63) of the present embodiment constitute at least a part of the force applying mechanism 24 capable of applying force to the grippers (particularly, the first gripper 31 described later).

In the present embodiment, the star-shaped cam 65 regulates a distance between the grippers 16a and 16b of each of the gripper pairs 16, and thus defines a minimum distance between the grippers 16a and 16b of each of the gripper pairs 16.

The star-shaped cam 65, as shown in FIG. 3, extends parallel to the rotary table 55 above the rotary table 55, and is attached to a leading end portion of the rotation shaft 54 to rotate integrally with the rotation shaft 54 and the rotary table 55. An outer peripheral portion of the star-shaped cam 65, as shown in FIG. 1, includes a plurality of cam protrusions 65a (e.g., eight cam protrusions 65a) provided at equal intervals (equal angle intervals). Between the cam protrusions 65a, cam cutout portions 65b are formed. Each of the cam protrusions 65a includes a cam inclined side 65c. The star-shaped cam 65 is disposed in such a manner that the cam inclined sides 65c can be brought into contact with a roller portion 67 (refer to FIG. 1) provided at the tip of a coupling shaft 40. Each of the roller portions 67 serves as an engaging pin for regulating closing operation of each of the gripper pairs 16. The closing operation of each of the gripper pairs 16 is regulated by bringing the cam inclined side 65c into contact with the roller portion 67. For example, a relatively large distance between the right and left grippers 16a and 16b of each of the gripper pairs 16 disposes the roller portion 67 at a position away from the cam inclined side 65c, so that the roller portion 67 does not regulate the distance between the grippers 16a and 16b (refer to the "process position P1" in FIG. 1). In contrast, a relatively small distance between the right and left grippers 16a and 16b of each of the gripper pairs 16 brings the roller portion 67 into contact with the cam inclined side 65c, so that movement of the roller portion 67 is regulated to prevent the distance between the grippers 16a and 16b from further decreasing (refer to the "process position P2" in FIG. 1).

As described above, a minimum distance between the right and left grippers 16a and 16b of each of the gripper pairs 16 is defied by placement of the star-shaped cam 65. While the star-shaped cam 65 is fixed to the rotation shaft 54 in the illustrated example, a position (particularly a position in the rotation direction (horizontal direction) of the rotation shaft 54) of the star-shaped cam 65 may be variable. Allowing a position of the star-shaped cam 65 to be variable enables a minimum distance between the grippers 16a and 16b of each of the gripper pairs 16 to be changed, and thus the grippers 16a and 16b can be flexible with the bags B (containers) of various sizes.

A mechanism for adjusting placement of the star-shaped cam 65 with respect to the rotation shaft 54 is not particularly limited, and any mechanism is available. For example, a knob having a shaft extending in a direction parallel to the axial direction of the rotation shaft 54 may be provided. The shaft of the knob includes a male threaded portion that screws into a female threaded portion of a bearing provided in the rotary table 55. When the knob is rotated, the knob moves axially while being guided by the female threaded portion and the male threaded portion. One end of an L-shaped lever is coupled to an end of the shaft of the knob, and thus the L-shaped lever swings around a pin when the end of the shaft of the knob moves axially. A roller is attached to the other end of the L-shaped lever, and is fitted into a fitting slit having a long hole shape formed in the star-shaped cam 65. In this structure, changing a posture of the L-shaped lever by rotating the knob for axial displacement enables adjustment of placement of the star-shaped cam 65 by changing a position of the roller in a direction (i.e., a rotation direction of the star-shaped cam 65 with respect to the rotation shaft 54) perpendicular to the axial direction. The mechanism for adjusting placement of the star-shaped cam 65 with respect to the rotation shaft 54 can be appropriately embodied by using a mechanism formed by combining known members, such as a mechanism disclosed in Japanese utility-model application publication No. 63-131905 (i.e., a mechanism including a crossbar, a sliding groove, a L-shaped lever, a pin, an axle box (bearing box), a roller, and a slit).

Next, detailed structure related to an opening/closing mechanism of a gripper pair 16 in accordance with the present embodiment will be described.

In the present embodiment, opening/closing operations of the right and left grippers 16a and 16b of two adjacent gripper pairs 16 (first gripper pair 21 and second gripper pair 22) are performed in conjunction with each other. That is, opening/closing operation of the first gripper 31 and the second gripper 32 constituting the first gripper pair 21 is performed in synchronization with opening/closing operation of the third gripper 33 and the fourth gripper 34 constituting the second gripper pair 22.

In the example illustrated, the first gripper 31 to the fourth gripper 34 are sequentially disposed in order from one side of the four grippers constituting the two gripper pairs 16, to the other side thereof (refer to FIGS. 1 and 2).

The plurality of gripper pairs 16 attached to the rotary table 55 may include only one "combination of the first gripper pair 21 and the second gripper pair 22" operating in conjunction with each other, or a plurality thereof. Particularly, in a case where a plurality of process positions (including the "process position P1" and the "process position P2" referred to in FIG. 1) are provided in the rotary gripper device 10, attaching the same number of the "combinations of the first gripper pair 21 and the second gripper pair 22" as the number of the process positions to the rotary table 55 enables sequential processes at the plurality of process positions in accordance with intermittent rotation of the rotary table 55, while the entire gripper device 10 can be reduced in size. Thus, in a case where eight process positions are provided, for example, it is preferable to provide eight "combinations of the first gripper pair 21 and the second gripper pair 22" to attach sixteen gripper pairs 16 in total to the rotary table 55. In this case, processes of two bags B supported by the first gripper pair 21 and the second gripper pair 22 while juxtaposed side by side can be performed at the respective process positions at a time.

As shown in FIG. 1, the coupling shaft 40 is provided in the gripper lever part 17 of the first gripper 31 in addition to the support 14 described above. In the present example, the gripper lever part 17 of the first gripper 31 is provided with the coupling shaft 40 on one end side with respect to the bent portion (central portion) of the gripper lever part 17, and a first elastic member support 44a for fixing one end of a first elastic member 44 is attached on the other end side with respect to the bent portion. One end of a coupling rod 46 is also attached on the other end side to be able to swing. In addition, the gripper lever part 17 of the fourth gripper 34 is provided with a fitting hole 41 along with the support 14 described above. The gripper lever part 17 of the fourth gripper 34 is provided with the first elastic member support 44a for fixing the other end of the first elastic member 44 on one end side with respect to the bent portion of the gripper lever part 17, and is provided with the fitting hole 41 on the other end side with respect to the bent portion.

As shown in FIG. 2, on one end side of the gripper lever part 17 of the second gripper 32 with respect to the bent portion of the gripper lever part 17, one end of a link member of a second coupling mechanism 52 is attached to be able to swing, and on the other end side with respect to the bent portion, one end of a second elastic member 50 is attached to be able to swing. In addition, on one end side of the gripper lever part 17 of the third gripper 33 with respect to the bent portion of the gripper lever part 17, the other end of the coupling rod 46 (refer to FIG. 1) and the other end of the second elastic member 50 (refer to FIG. 2) are attached to be able to swing, and on the other end side with respect to the bent portion, the other end of the link member of the second coupling mechanism 52 is attached to be able to swing (refer to FIG. 2).

As shown in FIG. 3, the second and third grippers 32 and 33 are each attached to the supports 14 at a position different from that of the first and fourth grippers 31 and 34 in terms of the axial direction of the support 14. For example, the first and second grippers 31 and 32 are attached to the same support 14, and are attached to axial positions different from each other in the same support 14 (in the example illustrated in FIG. 3, the first gripper 31 is provided on the upper side and the second gripper 32 is provided on the lower side). Likewise, the third and fourth grippers 33 and 34 are attached to the same support 14, and are attached to axial positions different from each other in the same support 14 (in the example illustrated in FIG. 3, the fourth gripper 34 is provided on the upper side and the third gripper 33 is provided on the lower side). Making attachment positions of the respective grippers different from each other with respect to the support 14 in this way can effectively avoid interference between the grippers. In the present example, the first and fourth grippers 31 and 34 attached to the different supports 14 are disposed at the same axial position (height). Likewise, the second and third grippers 32 and 33 attached to the different supports 14 are disposed at the same axial position. This further improves space efficiency.

In each of the first and fourth grippers 31 and 34, the gripper lever part 17 includes a horizontal portion extending in a horizontal direction perpendicular to the axial direction, and a downward portion extending axially downward from a leading end of the horizontal portion. From the downward portion, the gripper leading end portion 18 extends horizontally. In contrast, in each of the second and third grippers 32 and 33, the gripper lever part 17 includes a horizontal portion extending in a horizontal direction perpendicular to the axial direction, and an upward portion extending axially upward from a leading end of the horizontal portion. From the upward portion, the gripper leading end portion 18 extends horizontally. This enables the axial positions of the gripper leading end portion 18 and the clamp portion 19 of the first gripper 31 to be the same as the axial positions of the gripper leading end portion 18 and the clamp portion 19 of the second gripper 32. Likewise, the axial positions of the gripper leading end portion 18 and the clamp portion 19 of the third gripper 33 can be the same as the axial positions of the gripper leading end portion 18 and the clamp portion 19 of the fourth gripper 34.

Meanwhile, the distance adjustment mechanism 20 includes the force applying mechanism 24 capable of applying force to the first gripper 31, and a force transmitting mechanism 26 for transmitting force between the first and second grippers 31 and 32. The distance adjustment mechanism 20 further includes the first elastic member 44 that couples the first and fourth grippers 31 and 34 to each other. The first elastic member 44 of the present example illustrated in FIG. 1 is a tension spring, and the first elastic member 44 applies elastic force to the first and fourth grippers 31 and 34 in a direction approaching each other. In addition, the distance adjustment mechanism 20 further includes the second elastic member 50 that couples the second and third grippers 32 and 33 to each other. The second elastic member 50 of the present example illustrated in FIG. 2 is a compression spring, and the second elastic member 50 applies elastic force to the second and third grippers 32 and 33 in a direction away from each other. Specific structure of the first and second elastic members 44 and 50 is not particularly limited, and each of the first and second elastic members 44 and 50 may be composed of a single member or of a combination of a plurality of members. In the example illustrated, the first elastic member 44 is composed of a single member (coil spring), and the second elastic member 50 is composed of a combination of a plurality of members (a compression spring and a pair of brackets holding opposite ends of the compression spring). The two brackets provided in the second elastic member 50 are respectively attached to the second and third grippers 32 and 33 to be able to swing.

The force applying mechanism 24 of the present example includes the cylindrical cam 57 (cam face 58) and the cam lever part 61 (cam follower 62 and pressing roller 63), as described above. A relative position of the pressing roller 63 with respect to the first gripper 31 varies corresponding to the axial position of the cam face 58 at which the cam follower 62 is brought into contact with, and thus force applied to the first gripper 31 from the pressing roller 63 varies. For example, in a case where the pressing roller 63 is disposed at a position at which the pressing roller 63 is brought into contact with the first gripper 31 (refer to the "process position P1" in FIG. 1, and FIG. 4A), the opening/closing posture of the first gripper 31 is defined corresponding to the position of the pressing roller 63. In contrast, in a case where the pressing roller 63 is disposed at a position at which the pressing roller 63 is not brought into contact with the first gripper 31 (refer to the "process position P2" in FIG. 1, and FIG. 4B), the cam inclined side 65c of the star-shaped cam 65 and the roller portion 67 provided in the coupling shaft 40 are brought into contact with each other to define the opening/closing posture of the first gripper 31, and then the first gripper 31 takes an opening/closing posture unrelated to the position of the pressing roller 63. In a case where the cam inclined side 65c and the roller portion 67 are brought into contact with each other, the first gripper 31 (and second gripper 32, and third and fourth grippers 33 and 34) is most closed.

In this way, the force applying mechanism 24 adjusts force to be applied to the first gripper 31 to swing the first gripper 31, thereby adjusting a distance between the first and second grippers 31 and 32.

Meanwhile, the force transmitting mechanism 26 transmits force applied to the first gripper 31 from the force applying mechanism 24, to the fourth gripper 34 so as to swing the fourth gripper 34, thereby adjusting a distance between the fourth and third grippers 34 and 33. The force transmitting mechanism 26 of the present embodiment includes a first coupling mechanism 39 that couples the first and fourth grippers 31 and 34 to each other. The first coupling mechanism 39 of the present example illustrated in FIG. 1 includes the coupling shaft 40 provided with one of the first and fourth grippers 31 and 34 (provided with the first gripper 31 in the example illustrated), and the fitting hole 41 into which the coupling shaft 40 is fitted and which is provided in the other of the first and fourth grippers 31 and 34 (provided in the fourth gripper 34 in the example illustrated) to movably hold the coupling shaft 40. The fitting hole 41 of the present example has the shape of an elongated hole, and the coupling shaft 40 is provided to be freely movable (slidable) in an extension direction of the fitting hole 41 in a state where the coupling shaft 40 is fitted in the fitting hole 41.

The position of the coupling shaft 40 (particularly the position in a direction (i.e., horizontal direction) perpendicular to the axial direction) varies corresponding to an opening/closing posture of the first gripper 31 defined by the force applying mechanism 24, and a posture of the fourth gripper 34 is defined corresponding to the position of the coupling shaft 40. Particularly, the first coupling mechanism 39 of the present example including the coupling shaft 40 and fitting hole 41 described above allows the fourth gripper 34 to take a behavior and a posture which are symmetrical (preferably line-symmetrical) to those of the first gripper 31. For example, when the force applying mechanism 24 increases force to be applied to the first gripper 31, the first and fourth grippers 31 and 34 move against elastic force of the first elastic member 44 applied to the first and fourth grippers 31 and 34. As a result, the first gripper 31 moves in a direction away from the second gripper 32, and the fourth gripper 34 moves in a direction away from the third gripper 33. In contrast, when the first gripper 31 moves in a direction approaching the second gripper 32, the fourth gripper 34 moves in a direction approaching the third gripper 33.

Particularly, the present example allows the first and fourth grippers 31 and 34 to be coupled to each other by the first elastic member 44, and thus when the force applying mechanism 24 reduces force to be applied to the first gripper 31, the first and fourth grippers 31 and 34 move in a direction approaching each other by elastic force of the first elastic member 44. As described above, the first and fourth grippers 31 and 34 are coupled to each other by the first coupling mechanism 39 so that the first and fourth grippers 31 and 34 move in directions opposite to each other in terms of the opening/closing direction of the grippers.

The force transmitting mechanism 26 further includes the coupling rod 46 that couples the first and third grippers 31 and 33 to each other (refer to FIG. 1). The third gripper 33 moves in conjunction with the first gripper 31 through the coupling rod 46, and moves in the same direction as that of the first gripper 31 in terms of the opening/closing direction of the grippers. For example, when the first gripper 31 moves in a direction approaching the second gripper 32, the third gripper 33 moves in a direction approaching the fourth gripper 34.

In addition, the force transmitting mechanism 26 further includes the second coupling mechanism 52 that couples the second and third grippers 32 and 33 to each other. The second coupling mechanism 52 of the present example illustrated in FIG. 2 is configured by a link member, and couples the second and third grippers 32 and 33 to each other so that the second and third grippers 32 and 33 each can freely swing and have a behavior and a posture symmetrical (preferably line-symmetrical) to each other. Thus, for example, when the third gripper 33 moves in a direction approaching the fourth gripper 34, the second gripper 32 moves in a direction approaching the first gripper 31. When the third gripper 33 moves in a direction away from the fourth gripper 34, the second gripper 32 moves in a direction away from the first gripper 31.

The second and third grippers 32 and 33 of the present example illustrated in FIG. 2 are also coupled to each other by the second elastic member 50 of a compression spring type. Accordingly, increase in force applied to the third gripper 33 from the first gripper 31 through the coupling rod 46 allows the second and third grippers 32 and 33 to move against elastic force of the second elastic member 50 applied to the second and third grippers 32 and 33. As a result, the third gripper 33 moves in a direction away from the fourth gripper 34, and the second gripper 32 moves in a direction away from the first gripper 31. In contrast, decrease in the force applied to the third gripper 33 from the first gripper 31 through the coupling rod 46 allows the second and third grippers 32 and 33 to move in a direction away from each other by the elastic force of the second elastic member 50 applied to the second and third grippers 32 and 33. As described above, the second and third grippers 32 and 33 are coupled to each other by the second coupling mechanism 52 so that the second and third grippers 32 and 33 move in directions opposite to each other in terms of the opening/closing direction of the grippers.

The gripper pairs 16 (first gripper pair 21 and second gripper pair 22) having the structure described above allow force applied to the first gripper 31 by the cam lever part 61 (force applying mechanism 24) to be transmitted to the fourth gripper 34 through the first coupling mechanism 39 (coupling shaft 40 and fitting hole 41), as well as transmitted to the third gripper 33 through the coupling rod 46. In addition, the force applied to the first gripper 31 is transmitted to the second gripper 32 through the coupling rod 46, the third gripper 33, and the second coupling mechanism 52.

The force applied to one gripper (i.e., first gripper 31) in this way is also transmitted to the other three grippers (i.e., the second gripper 32, the third gripper 33, and the fourth gripper 34) through the force transmitting mechanism 26. As a result, each of the gripper pairs 16 (the first gripper pair 21 and the second gripper pair 22) can be appropriately opened and closed.

As described above, according to the present embodiment, the right and left grippers 16a and 16b constituting each of the gripper pairs 16 are swingably fixed to the rotary table 55 through the same support 14, and thus a plurality of gripper pairs 16 can be compactly provided. In addition, it is possible to properly transmit force to each of the grippers constituting the gripper pairs 16 to accurately control opening/closing operation of each of the gripper pairs 16.

While the conventional device described above needs four supports 14 to swing four grippers, the present embodiment enables four grippers (the first gripper 31 to the fourth gripper 34) to be swingably supported by two supports 14. This enables a distance between the right and left grippers 16a and 16b to be reduced as compared with the conventional device. In addition, a space for providing the gripper pairs 16 based on the present embodiment can be reduced as compared with a space for providing conventional gripper pairs, and thus the diameter of the rotary table 55 can be reduced as compared with the diameter of the conventional rotary table. Reducing the rotary table 55 in diameter can reduce centrifugal force applied to a bag B and contents thereof during rotational conveyance. As a result, it is possible to effectively prevent the contents of a bag B from spilling out during the rotational conveyance.

Modification

The present invention is not limited to the embodiment described above, and other modifications may be added.

For example, structure of the first coupling mechanism 39 and the second coupling mechanism 52 is not particularly limited. The first coupling mechanism 39 may be formed by a link mechanism, and the second coupling mechanism 52 may be formed by a combination of a coupling shaft and a fitting hole.

While the embodiment above is described as an example in which the cylindrical cam 57 does not rotate even if the rotation shaft 54 rotates, the cylindrical cam 57 may rotate together with the rotation shaft 54. For example, in a case where the rotation shaft 54 and the rotary table 55 rotate by only a predetermined angle, the cylindrical cam 57 may rotate together with the rotation shaft 54 and the rotary table 55 by the same predetermined angle. In this case, the cylindrical cam 57 may be configured to rotate once together with the rotation shaft 54 and the rotary table 55 by the predetermined angle and then to rotate inversely by the predetermined angle to return to the initial position after the rotation shaft 54 and the rotary table 55 are stopped. Accordingly, in a case where a step of opening the inlet portion of a bag B and a step of filling the bag B with contents through the inlet portion are performed at adjacent process positions, for example, a bag B can be conveyed to a process position at which the step of filling the bag B is to be performed while a distance between grippers realized in the step of opening the inlet portion is maintained. Movement control of the cylindrical cam 57 as described above can be achieved by a driving device (not illustrated) for moving the cylindrical cam 57 and a controller (not illustrated) for controlling the driving device, for example.

An element constituting the force applying mechanism 24 is not limited to the cam lever part 61, and any structure capable of applying force required for opening/closing the gripper pairs 16 to a desired gripper is available. Specific structure of the force transmitting mechanism 26 is also not limited. In the example described above, while force is transmitted to the fourth gripper 34 and the third gripper 33 from the first gripper 31, and is transmitted to the second gripper 32 from the third gripper 33, a transmission path of force transmitted to each of the grippers by the force transmitting mechanism 26 is not limited to the example described above. That is, the force transmitting mechanism 26 can be formed by any element (e.g., a coupling mechanism and a link mechanism) capable of properly controlling opening/closing operation of the first and second gripper pairs 21 and 22 by properly coupling a part of or all of the grippers (i.e., the first gripper 31 to the fourth gripper 34) constituting the first and second gripper pairs 21 and 22, to each other, to transmit force from the force applying mechanism 24 to a part of or all of the first gripper 31 to the fourth gripper 34.

Thus, while the embodiment above is described as an example in which one of four grippers constituting two gripper pairs 16 (the first gripper pair 21 and the second gripper pair 22) disposed on an outermost side constitutes "the first gripper 31 to which force is applied by the force applying mechanism 24 (cam lever part 61)", a gripper disposed at another position can constitute "the first gripper 31 to which force is applied by the force applying mechanism 24 (cam lever part 61)".

In addition, while the embodiment above is described as an example in which the rotation shaft 54 and the rotary table 55 intermittently rotate, the present invention is applicable to a device and a method in which the rotation shaft 54 and the rotary table 55 continuously rotate.

The present invention is not limited to each of the embodiments described above, and includes a variety of modifications that can be conceived by a person skilled in the art. Advantageous effect of the present invention is also not limited to the contents described above. That is, a variety of additions and alterations, and partial elimination are possible without departing from the scope of conceptional idea and spirit of the present invention derived from contents defined in the claims and equivalents thereof.

The invention claimed is:

1. A gripper device comprising:
a carrier device movably provided;
a plurality of gripper pairs attached to the carrier device through supports; and
a distance adjustment mechanism that adjusts a distance between two grippers included in each of the plurality of gripper pairs,
wherein the two grippers included in each of the plurality of gripper pairs are attached to the carrier device through a same support, and
wherein the distance adjustment mechanism swings at least one of the two grippers included in each of the plurality of gripper pairs around the same support in such a manner that a distance between the two grippers is adjusted,
wherein the plurality of gripper pairs includes a first gripper pair having first and second grippers, and a second gripper pair having third and fourth grippers,
wherein the distance adjustment mechanism includes a force applying mechanism capable of applying force to the first gripper, and a force transmitting mechanism that transmits force between the first gripper pair and the second gripper pair,
wherein the force applying mechanism swings the first gripper to adjust a distance between the first gripper and the second gripper, and
wherein the force transmitting mechanism transmits the force applied to the first gripper from the force applying mechanism, to the fourth gripper to swing the fourth gripper in such a manner that a distance between the third and fourth grippers is adjusted.

2. The gripper device as defined in claim 1, wherein the force transmitting mechanism includes a first coupling mechanism that couples the first and fourth grippers to each other, and wherein, when the force applying mechanism moves the first gripper in a direction away from the second gripper, the fourth gripper moves in a direction away from the third gripper.

3. The gripper device as defined in claim 2, wherein the distance adjustment mechanism includes a first elastic member that couples the first and fourth grippers to each other, wherein, when the force applying mechanism increases the force applied to the first gripper, the first and fourth grippers move against elastic force of the first elastic member applied to the first and fourth grippers, and wherein, when the force applying mechanism reduces the force applied to the first gripper, the first and fourth grippers move due to the elastic force of the first elastic member.

4. The gripper device as defined in claim 3, wherein the force transmitting mechanism includes a coupling rod that couples the first and third grippers to each other, and wherein the third gripper swings in conjunction with the first gripper.

5. The gripper device as defined in claim 4, wherein the distance adjustment mechanism includes a second elastic member that couples the second and third grippers to each other, wherein the force transmitting mechanism includes a second coupling mechanism that couples the second and third grippers to each other, wherein, when the third gripper moves in a direction approaching the fourth gripper, the second gripper moves in a direction approaching the first gripper, and wherein, when the third gripper moves in a direction away from the fourth gripper, the second gripper moves in a direction away from the first gripper.

6. The gripper device as defined in claim 3, wherein the distance adjustment mechanism includes a second elastic member that couples the second and third grippers to each other, wherein the force transmitting mechanism includes a second coupling mechanism that couples the second and third grippers to each other, wherein, when the third gripper moves in a direction approaching the fourth gripper, the second gripper moves in a direction approaching the first gripper, and wherein, when the third gripper moves in a direction away from the fourth gripper, the second gripper moves in a direction away from the first gripper.

7. The gripper device as defined in claim 2, wherein the force transmitting mechanism includes a coupling rod that couples the first and third grippers to each other, and wherein the third gripper swings in conjunction with the first gripper.

8. The gripper device as defined in claim 7, wherein the distance adjustment mechanism includes a second elastic member that couples the second and third grippers to each other, wherein the force transmitting mechanism includes a second coupling mechanism that couples the second and third grippers to each other, wherein, when the third gripper moves in a direction approaching the fourth gripper, the second gripper moves in a direction approaching the first gripper, and wherein, when the third gripper moves in a direction away from the fourth gripper, the second gripper moves in a direction away from the first gripper.

9. The gripper device as defined in claim 2, wherein the distance adjustment mechanism includes a second elastic member that couples the second and third grippers to each other, wherein the force transmitting mechanism includes a second coupling mechanism that couples the second and third grippers to each other, wherein, when the third gripper moves in a direction approaching the fourth gripper, the second gripper moves in a direction approaching the first gripper, and wherein, when the third gripper moves in a direction away from the fourth gripper, the second gripper moves in a direction away from the first gripper.

10. The gripper device as defined in claim 1, wherein the force transmitting mechanism includes a coupling rod that couples the first and third grippers to each other, and wherein the third gripper swings in conjunction with the first gripper.

11. The gripper device as defined in claim 10, wherein the distance adjustment mechanism includes a second elastic member that couples the second and third grippers to each other, wherein the force transmitting mechanism includes a second coupling mechanism that couples the second and third grippers to each other, wherein, when the third gripper moves in a direction approaching the fourth gripper, the second gripper moves in a direction approaching the first gripper, and wherein, when the third gripper moves in a direction away from the fourth gripper, the second gripper moves in a direction away from the first gripper.

12. The gripper device as defined in claim 1, wherein the distance adjustment mechanism includes a second elastic member that couples the second and third grippers to each other, wherein the force transmitting mechanism includes a second coupling mechanism that couples the second and third grippers to each other, wherein, when the third gripper moves in a direction approaching the fourth gripper, the second gripper moves in a direction approaching the first gripper, and wherein, when the third gripper moves in a direction away from the fourth gripper, the second gripper moves in a direction away from the first gripper.

13. The gripper device as defined in claim 1, wherein the second and third grippers are attached to the supports at a position different, in terms of an axial direction of the supports, from that of the first and fourth grippers.

14. The gripper device as defined in claim 1, wherein the carrier device includes a rotation shaft, and a rotary table that is attached to the rotation shaft and is rotated with the rotation shaft, wherein the plurality of gripper pairs are attached to the rotary table through the supports, wherein the force applying mechanism includes a cylindrical cam having a cam face, a cam lever part attached to the rotary table, the cam lever part including a cam follower that moves on the cam face, and a pressing roller that can be brought into contact with the first gripper, wherein a position of the cam face changes in an axial direction of the rotation shaft with respect to a rotation direction of the rotary table, wherein the cam follower is brought into contact with the cam face at a position depending on rotation of the rotary table, and wherein the cam lever part takes a posture corresponding to a position at which the cam follower is in contact with the cam face, and varies force to be applied to the first gripper through the pressing roller depending on the posture.

* * * * *